(12) United States Patent
Friesel (10) Patent No.: US 8,184,041 B1
(45) Date of Patent: May 22, 2012

(54) SEARCH OF AN ACQUISITION FACE WITH MODIFIED SPY RADAR (75) Inventor: Mark A. Friesel, Ewing, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 659 days.

(21) Appl. No.: 12/246,793

(22) Filed: Oct. 7, 2008

(51) Int. Cl.
G01S 13/66 (2006.01)
G01S 13/72 (2006.01)
G01S 7/02 (2006.01)
G01S 13/00 (2006.01)

(52) U.S. Cl. ......... 342/158; 342/59; 342/61; 342/62; 342/73; 342/74; 342/75; 342/81; 342/89; 342/94; 342/95; 342/96; 342/147; 342/175; 342/195

(58) Field of Classification Search ......... 342/13–20, 342/27, 28, 59, 73–97, 104, 117, 147–158, 342/175, 195, 368–377, 61, 62, 165–174
See application file for complete search history.

(56) References Cited

U.S. PATENT DOCUMENTS

| | | | | |
|---|---|---|---|---|
| 3,670,331 A * | 6/1972 | Rittenbach | | 342/157 |
| 3,680,100 A * | 7/1972 | Woerrlein | | 342/13 |
| 4,090,197 A * | 5/1978 | Cantrell | | 342/148 |
| 5,239,301 A * | 8/1993 | Martin | | 342/375 |
| 5,410,316 A * | 4/1995 | Brooks | | 342/59 |
| 5,757,310 A * | 5/1998 | Millward | | 342/95 |
| 6,842,137 B2 * | 1/2005 | Gounalis | | 342/20 |
| 6,873,284 B2 * | 3/2005 | Gounalis | | 342/13 |
| 6,894,634 B2 * | 5/2005 | Gounalis | | 342/13 |
| 6,894,635 B2 * | 5/2005 | Gounalis | | 342/13 |
| 6,917,325 B2 * | 7/2005 | Gounalis | | 342/20 |
| 6,989,780 B2 * | 1/2006 | Gounalis | | 342/13 |
| 7,038,611 B2 * | 5/2006 | Gounalis | | 342/13 |
| 7,038,615 B2 * | 5/2006 | Brookner | | 342/157 |
| 7,176,826 B2 * | 2/2007 | Gounalis | | 342/13 |
| 7,236,119 B2 * | 6/2007 | Gounalis | | 342/20 |
| 7,248,203 B2 * | 7/2007 | Gounalis | | 342/13 |
| 7,348,919 B2 * | 3/2008 | Gounalis | | 342/13 |
| 7,358,887 B2 * | 4/2008 | Gounalis | | 342/20 |
| 7,791,526 B2 * | 9/2010 | Gounalis | | 342/13 |

* cited by examiner

Primary Examiner — Bernarr Gregory
(74) Attorney, Agent, or Firm — Howard IP Law Group, PC

(57) ABSTRACT

Radar beams for searching a volume are selected by determining the central angle and azimuth and elevation extents to define an acquisition face. The number of beams $N_{MBA}$ required to cover the acquisition face is determined by $$N_{MBA} = (2n+1)\left(m+\frac{1}{2}\right) + \frac{(-1)^{n+m}}{2} \qquad (2)$$

The number of beams $N_{MBA}$ is multiplied by the dwell per beam to determine the total search time, which is compared with a maximum time; (a) if the total search time is greater than the permissible time, the acquisition face is partitioned, and (b) if the total search time is less, the acquisition face information is applied to a radar processor for filling the unextended acquisition face with the number $N_{MBA}$ of beams in a particular pattern.

15 Claims, 8 Drawing Sheets

SEARCH OF AN ACQUISITION FACE WITH MODIFIED SPY RADAR

BACKGROUND OF THE INVENTION

Figures 1A, 1B:
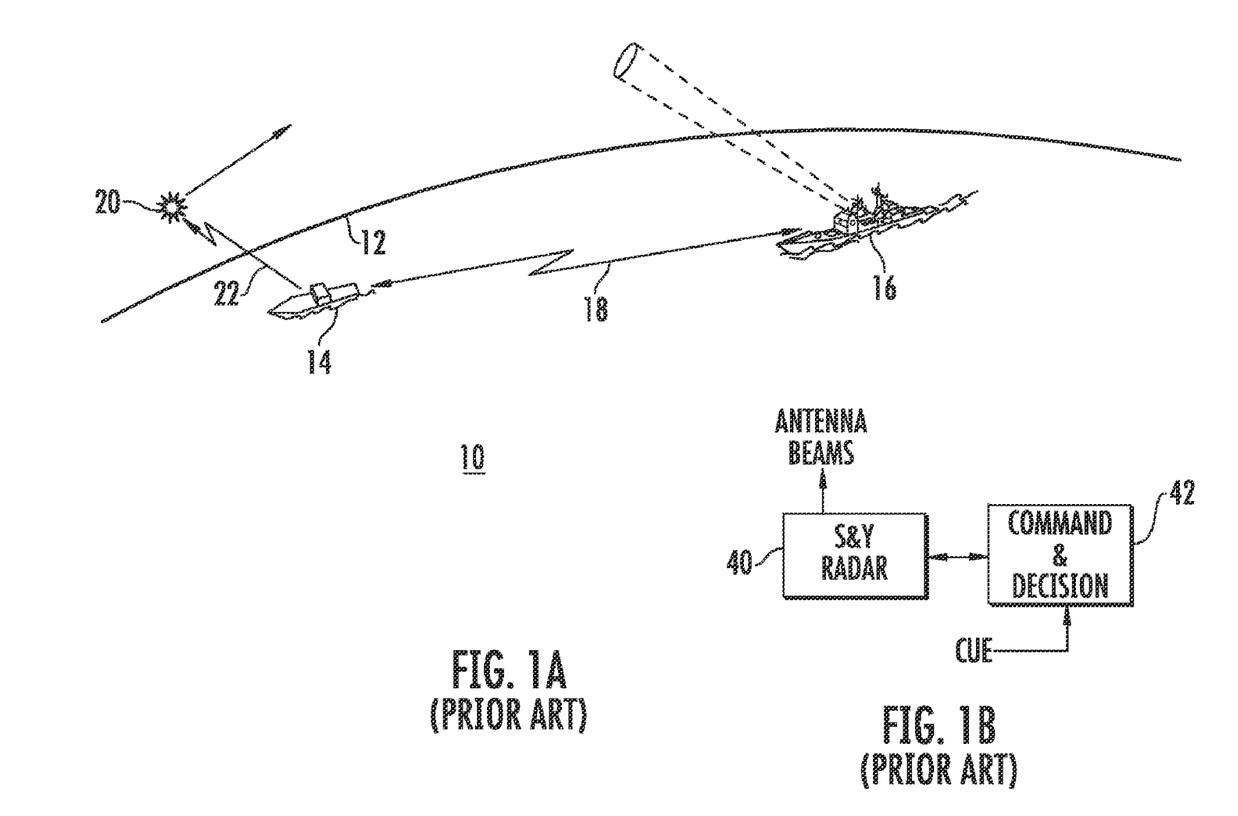
FIG. 1A represents a simplified prior-art maritime scenario including the horizon, two intercommunicating friendly ships, and an object or "target.
" and FIG. 1B is a simplified block diagram illustrating radar and Command & Decision portions of the equipment on one of the ships of FIG. 1A.

FIG. 1A represents a maritime scenario 10 in which the horizon is designated 12, and two friendly Aegis ships 14 and 16 communicate by a path illustrated by "lightning bolt" symbol 18. An object or "target" illustrated as 20 is near ship 14, and is detected by sensors (not separately illustrated) aboard ship 14, as suggested by lightning bolt symbol 22. Ship 16 has not sensed the presence of object 20. Target location information in ship 14 coordinates (cue information) is transmitted by way of communication path 18 from ship 14 to ship 16. The purpose of the cue information is to enable ship 16 to direct its radar sensor toward the target without the need to search the entire environment. FIG. 1B is a simplified block diagram of equipment or functions on ship 16. In FIG. 1B, the SPY radar system 40 communicates with a command and control function 42. Command and control function 42 receives cue information in the form of target state (location) and covariance (error) and converts the cue information to local (ship 16) coordinates. In addition, command and decision 42 determines from the variance or error the extent of the region that must be searched to be sure of locating the target.

SPY radar systems are used on AEGIS warships. The SPY radar systems use sequential pencil beams to search an acquisition face. These warships or platforms are equipped with communications facilities which allow sharing of sensor information among various spaced-apart platforms. In one version, the command and decision portion of the radar system receives, from a remote source, cue information relating to the approximate location of a target(s), which approximate location is defined by a state and associated covariance or uncertainty. The command and decision logic calculates the size of the necessary search region (acquisition face and range), and sends the resulting search volume to the SPY radar control.

In theory, SPY radar control places a pencil beam at the center of the search face specified by command and control, and determines the center location of the beams vertically and horizontally adjacent to the center beam. The center locations of the current beam are compared with the acquisition boundaries (the boundaries of the acquisition face), and if it lies within the boundaries the beam is scheduled for use. If the beam center lies without the acquisition boundaries, it is dropped, and not scheduled. When all the beams have been scheduled for a given search, the beams are sequentially generated, starting at the center of the search face, and expanding the search by placing beams in a "rosette" pattern about the center in an expanding manner. This allows the most likely position of the target to be searched first.

Figure 2A:
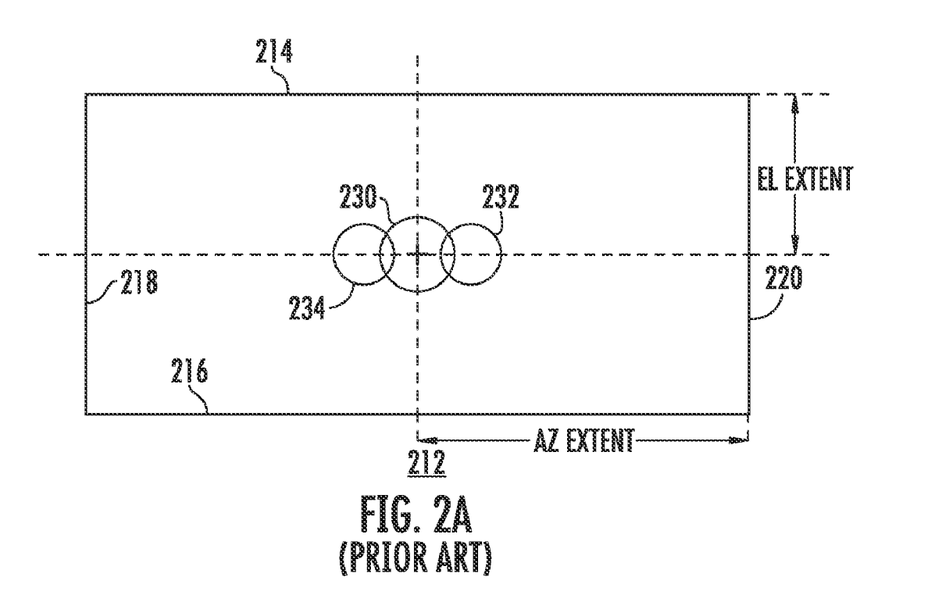
FIG. 2A represents a search face as defined by the command and decision portion of the warship of FIG. 1B in response to cue information received from a remote source.
Figure 2B:
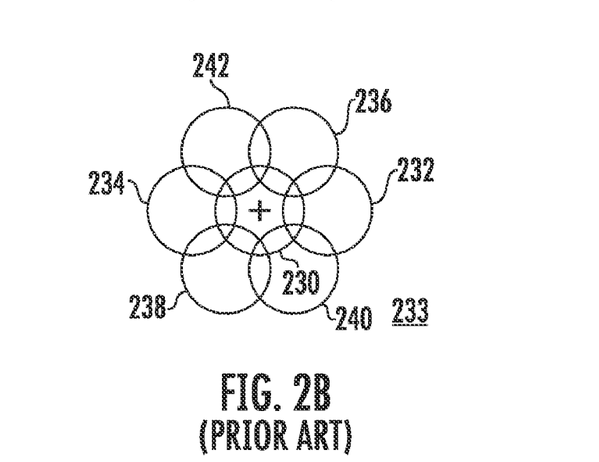
FIG. 2B represents the "rosette" pattern by which antenna beams are added about the first beam on the search face of FIG. 2A.

FIG. 2A represents a search face 212 as defined by the command and decision portion of a warship in response to cue information received from a remote source. In FIG. 2A, the search face 212 is defined by horizontal and vertical lines 214, 216, 218, and 220. The center of the pattern is identified by a cross or plus (+) symbol. The elevation extent of the search face 212 as defined by the command and decision equipment or function extends from the center (+) to horizontal line 214 or 216 and is designated "El extent". The azimuth extent of the search face as defined by command and decision extends from the center (+) to vertical line 218 or 220. Circle 230 of FIG. 2A represents the first pencil beam, which is ultimately placed at the center of the search face. The rosette pattern by which placement of further beams is controlled places the second beam 232 on one side of central beam 230, with its center separated in azimuth from the center of central beam 230. The third beam 234 is place on the other side of the central beam 230, similarly displaced in azimuth. FIG. 2B illustrates a central rosette 233 of six beams. In FIG. 2B, the rosette includes central beam 230, first and second azimuthally-displaced beams 232 and 234, and additional beams 236, 238, 240, and 242, which can be added in the sequence defined by their reference numerals. This pattern continues, with the addition of more beams, until the search face 212 of FIG. 2A is filled. It should be emphasized that actual beam placement does not begin until all the calculations are finished and all the beams are scheduled.

Figure 2C:
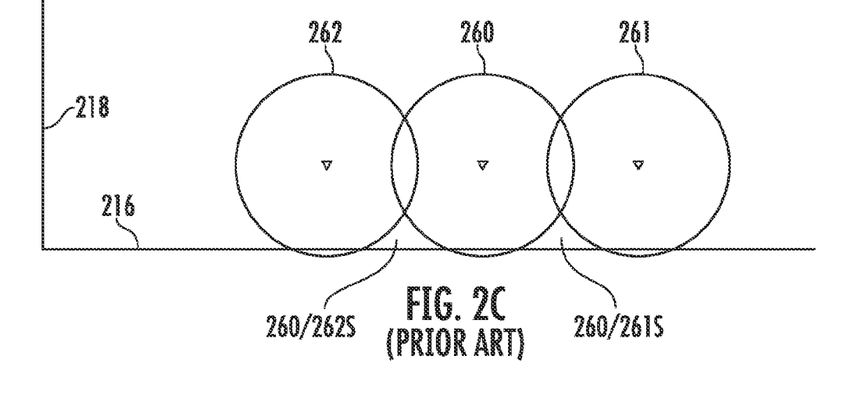
FIG. 2C illustrates the "scalloping" that can occur between beams situated at the edge of the search face of FIG. 2A.

In operation of the basic SPY system, the beams are added in the rosette pattern so long as the beam centers lie within the area defined by lines 214, 216, 218, and 220. FIG. 2C illustrates some beams 260, 261, and 262 lying near edge 216. As illustrated, these beams at the boundaries of the search face overlap, as illustrated in FIG. 2C. In FIG. 2C, beams 260, 261, and 262 have their centers within the boundary of the acquisition face 212 of FIG. 2A. As illustrated, the overlap of beams 260, 261, and 262 leaves an approximately triangular "scallop" region unfilled between each beam. More particularly, the scallop region between beams 260 and 261 is designated 260/261s, and the scallop region between beams 260 and 262 is designated 260/262s. These scallop regions are only nominally unfilled, since the illustrated beam contour actually represents a region in which beam energy exists, but at a lower magnitude or intensity than the design values. One possible way to go forward is to ignore the slight loss of coverage occasioned by scalloping.

Figure 2D:
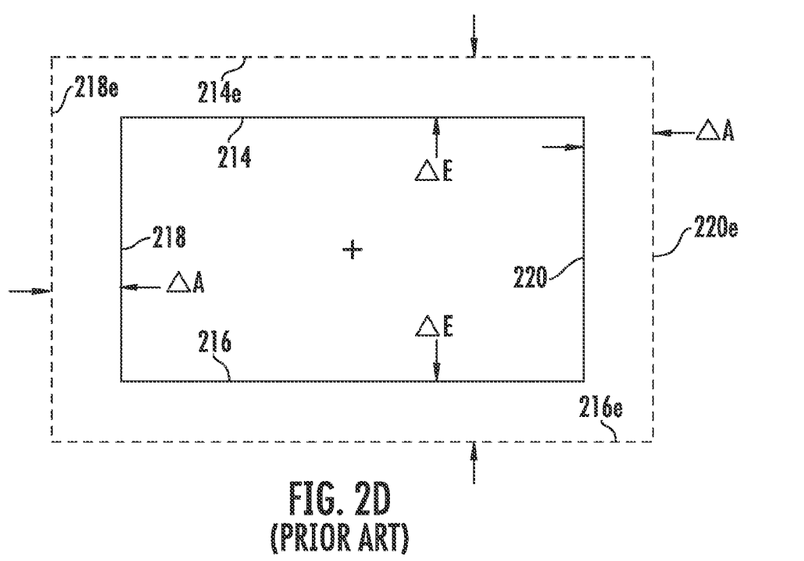
FIG. 2d illustrates boundaries of the search face of FIG. 2A extended by padding so that the scalloping is covered.

In order to fill the scallop regions, the SPY radar system modifies the boundaries 214, 216, 218, and 220 illustrated in FIG. 2A (as specified by command and decision) by adding vertical and horizontal "pads." FIG. 2D illustrates the search face or pattern of FIG. 2A with the addition of padding in the form of extended boundaries. The boundaries are extended in the horizontal direction by an amount delta azimuth ($\Delta A$) and in the elevation or vertical direction by an amount delta E ($\Delta E$). The resulting extended boundaries are designated in FIG. 2D as 214e, 216e, 218e, and 220e. The magnitudes of $\Delta A$ and $\Delta E$ are selected to be equal to the spacing between the centers of the beams. The SPY radar system then fills in the extended boundaries 260 with beams following the same "rosette" pattern previously described, again so long as the beam centers lie within the extended boundaries. The additional beams are scheduled if the beam centers lie within the extended boundaries and are dropped if they lie without. Once all the beams have been processed, those scheduled can be generated.

Figure 3:
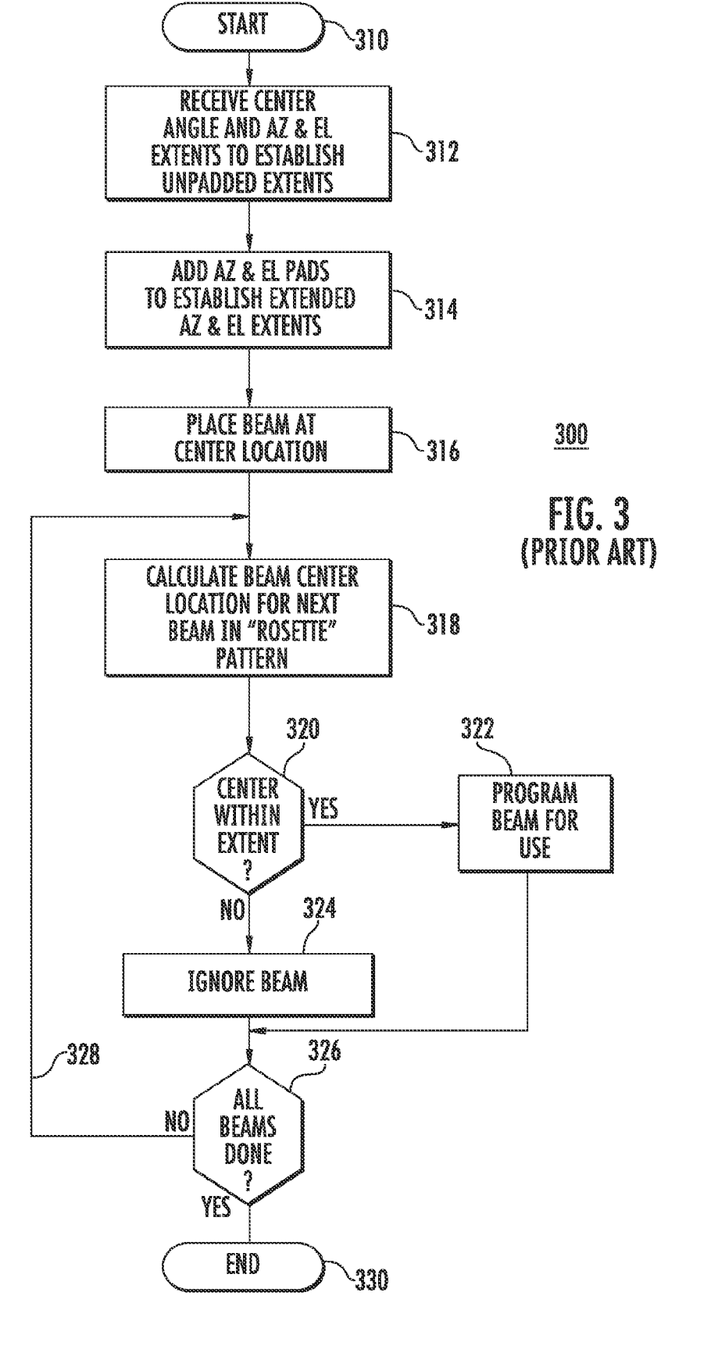
FIG. 3 is a simplified logic of control flow chart or diagram illustrating prior-art processing performed in the radar portion of the block diagram of FIG. 1B.

Thus, the processing in the SPY radar block 40 of FIG. 1A may be represented by the logic or control logic 300 of FIG. 3. In FIG. 3, logic 300 begins at a START block 310, and flows to a block 312. Block 312 represents the receipt or acquisition of information relating to the center angle of the search face, and the angular extents in azimuth and elevation, as determined by Command & Decision block 42 of FIG. 1B. Block 314 represents the addition of azimuth and elevation padding. This padding is a predetermined angle for each of azimuth and elevation. The azimuth and elevation padding may be in the same amount. The logic 300 of FIG. 3 flows to a block 316, which represents scheduling the "placement" of an antenna beam at the center of the reported or cued search face. It should be understood that the placement may be only a scheduling, rather than actual formation of the beam, with the actual beam placement or generation delayed until all the calculations are complete. From block 316, the logic 300 flows to a block 318, which represents the calculation of the location of the center of the next beam of the "rosette" pattern. A decision block 320 determines whether or not the beam center location so calculated lies within the padded extent. If the beam center does not lie within the padded extent, the logic leaves decision block 320 by the NO output, and arrives at a block 324. Block 324 represents the non-scheduling or ignoring of the beam. On the other hand, if decision block 320 finds that the beam center lies within the padded extent, the logic flows to a block 322, which represents the scheduling of the beam. From either block 322 or 324, the logic flows to a further decision block 326, which determines if all beams have been evaluated. If not, the logic leaves decision block 326 by the NO output, and returns by a logic path 328 to block 318, to begin another iteration through the loop including blocks 318, 320, 322, 324, and 326. Eventually, all the beams will have been evaluated, and the logic leaves decision block 326 by the YES output, and arrives at a logic END block 330.

Figure 4:
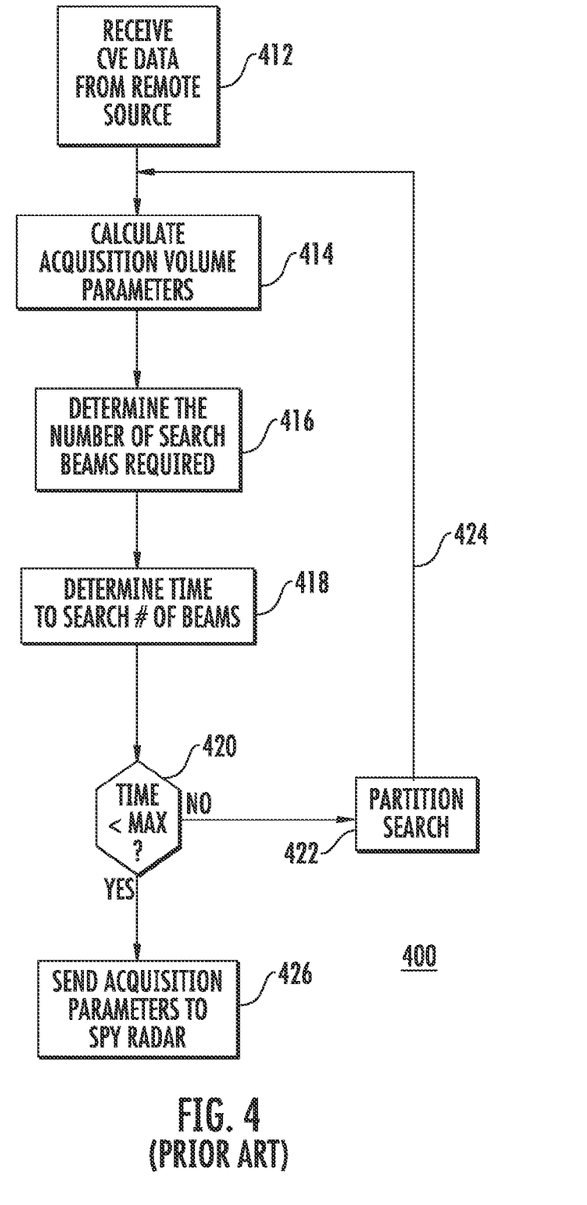
FIG. 4 is a simplified logic or control flow chart or diagram illustrating prior-art processing performed in the Command & Decision portion of the block diagram of FIG. 1B.

FIG. 4 is a simplified logic or control flow chart or diagram 400 illustrating relevant portions of the operation of Command & Decision block 42 of FIG. 1B. In FIG. 4, the logic begins at a block 412, which represents the receipt of cue data from a remote source. The remote source may be, for example, a forwardly-located or picket ship, such as ship 14 of FIG. 1. From block 412, the logic 400 flows to a block 414, which represents calculation of the acquisition volume. The cue information about the location of the target is converted to local coordinates, and the acquisition face area is determined by Command and Decision by considering the nominal state or location of the target 20 as reported, and expanding the region depending upon the covariance or error in the measured location. The acquisition volume is determined from the acquisition face area and the reported range of the target, with its covariance. From block 414, the logic 400 flows to a block 416.

Block 416 of FIG. 4 represents determination of the number of beams required to cover the padded search face, which is illustrated as 212 in FIG. 1A. This determination of the number $N_E$ of beams is made by equation (1)

$$N_E = \left[1 + 2\text{floor}\left(\frac{A_{ext}}{2\Delta A} + \frac{1}{2}\right)\right]\left[1 + 2\text{floor}\left(\frac{E_{ext}}{2\Delta E} + \frac{1}{2}\right)\right] + 4\left[1 + \text{floor}\left(\frac{A_{ext}}{2\Delta A}\right)\right]\left[1 + \text{floor}\left(\frac{E_{ext}}{2\Delta E}\right)\right]$$

where
$N_E$ is the number of beams SPY must use to completely cover the extended (padded) search face.
$A_{ext}$ is the azimuth extent (Az extent in FIG. 2A),
$E_{ext}$ is the elevation extent (El extent in FIG. 2A),
$\Delta A$ and $\Delta E$ are delta A and delta E as defined above,
floor(x) is a function that truncates its argument x into the highest integer less than or equal to x.

From block 416, the logic 400 of FIG. 4 flows to a block 418. Block 418 of FIG. 4 represents calculation of the time required to search the acquisition volume. This time is nominally the number of beams in the acquisition face multiplied by the time for the energy of a beam to reach the maximum range and to return. This time is the well-known 10.8 microseconds (μS) per statute mile or 12.4 microseconds per nautical mile. Decision block 420 compares the time required to search the nominal acquisition volume with the maximum time allowable per search by the SPY radar system (block 40 of FIG. 1B). If the time required to search the nominal acquisition volume is less than the maximum, logic 400 of FIG. 4 leaves decision block 420 by the YES output, and flows to a block 426. Block 426 represents the sending of the acquisition volume from Command & Decision 42 to SPY radar 40 for generation of the beams to cover the search area as described in conjunction with FIGS. 2A, 2B, 2C, and 2D.

If the time required to search the acquisition volume is determined in decision block 420 to be greater than the allowable search time, the logic 400 of FIG. 4 leaves the decision block by the NO output, and flows to a block 422. Block 422 represents partition of the search volume, and the parameters of the partitioned acquisition volumes are returned by a logic path 424 to block 414 to start another iteration through the logic 400.

SUMMARY OF THE INVENTION

A method according to an aspect of the invention is for selecting radar beams for searching a search volume, based upon, or from, estimated target angle and angle covariance together with target range. The method comprises the step of determining the central angle and the azimuth and elevation extents required to be searched, to thereby define an acquisition face. The number of beams $N_{MBA}$ that are required to cover the acquisition face is calculated by $$N_{MBA} = (2n+1)\left(m + \frac{1}{2}\right) + \frac{(-1)^{n+m}}{2} \quad (2)$$

where:

$$m = \text{ceiling}\left(\frac{A_{ext}}{\Delta A}\right) \quad (3)$$

is the minimum number of beams in a beam row (defined as adjacent beams with centers at constant elevation and separated by $2\Delta A$) required to completely cover an azimuth extent $A_{ext}$;

$$n = \text{ceiling}\left(\frac{E_{ext} - \frac{\beta}{2}\sin\alpha}{\Delta E}\right) \quad (4)$$

where:
$n_E=2n+1$ is the number of beam rows required to completely cover an acquisition face with elevation extent $E_{ext}$ where the difference in elevation of adjacent beam rows, i.e. the separation in the direction of elevation of the centers of beams in adjacent rows, is given by $\Delta E$;
ceiling(x) is the smallest integer greater than or equal to x;
β is the beam width, the cross-section of a typical radar beam is a circular region of diameter β within which the beam energy is higher than a threshold value such as 3 dB, and outside of which the energy is less than this threshold; and
α is equal to ½ the acute angle between two lines extending from the center of a radar beam to the points of intersection of the circumference of the beam with the circumference of an adjacent beam.

The number of beams $N_{MBA}$ is multiplied by the dwell per beam to thereby determine the total search time, and the total search time so determined is compared with a maximum permissible search time, and
(a) if the total search time is greater than the maximum permissible search time, the acquisition face is partitioned, and for the partitioned acquisition face, at least the steps of calculating the number of beams $N_{MBA}$, multiplying the number of beams NMBA by the dwell per beam to determine the total search time, and comparing the total search time with a maximum permissible search time are repeated (b) if the total search time is less than the maximum permissible search time, the acquisition face information is applied to a radar processor for filling the unextended acquisition face with the number $N_{MBA}$ of beams. Using the radar processor, the unextended acquisition face is filled with the number $N_{MBA}$ of beams in a particular pattern, which may be a rosette pattern.

DESCRIPTION OF THE INVENTION

The prior-art arrangement results in searching of a volume which is larger than that necessary as defined by the command and decision. The padding added in the SPY radar 40 of FIG. 1B may result in as much as two unnecessary rows or columns of beams. Since the SPY radar system will abort a search when the search exceeds a given time, the increase in the search volume occasioned by padding may increase the search time to the point at which the search is aborted, or result in partitioning of the search volume. Either of these results increases the effective search time.

Figure 5:
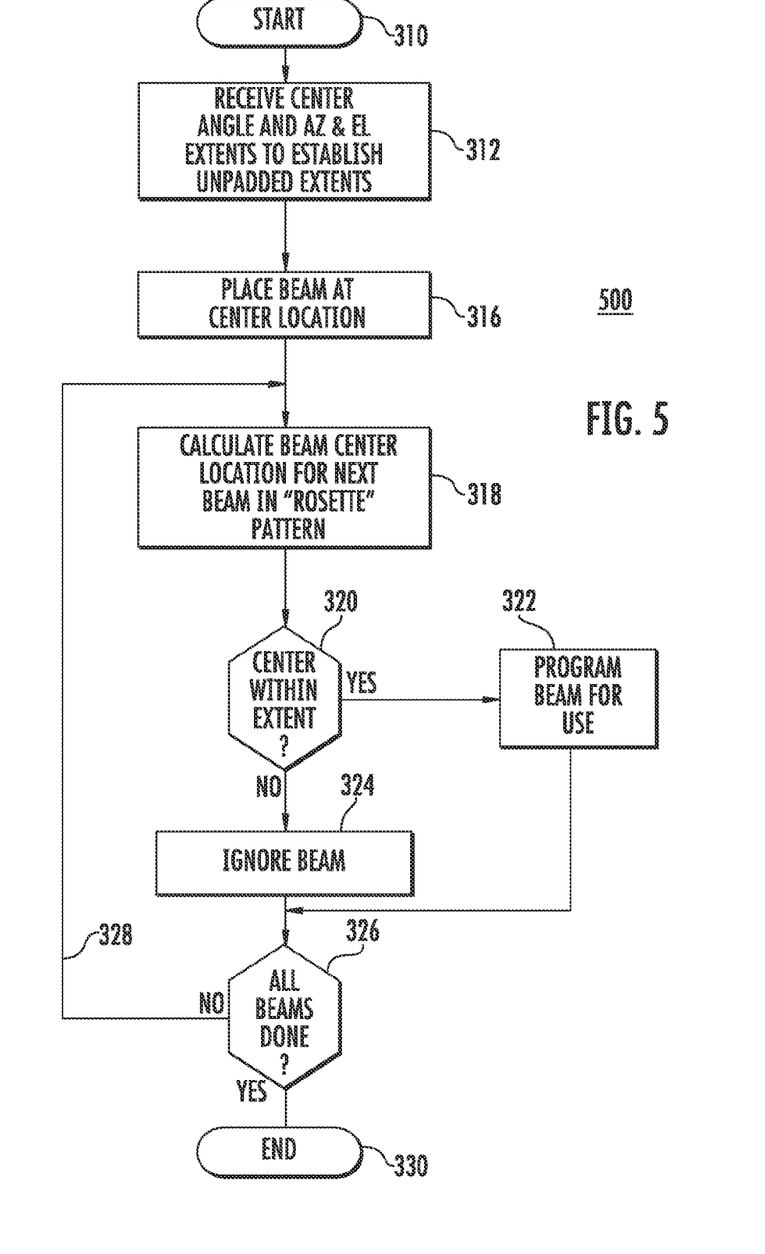
FIG. 5 is a simplified logic or control flow chart or diagram generally similar to that of FIG. 3, showing modifications to the logic of the radar portion of the block diagram of FIG. 1B.

According to an aspect of the invention, the SPY radar system is modified so as to eliminate the padding function, and the Command & Decision processing is modified to cover the unpadded acquisition face and volume. FIG. 5 is a simplified logic or control flow chart or diagram similar to that of FIG. 3, illustrating the deletion of the padding function from the processing of the SPY radar block 40 of FIG. 1B. In FIG. 5, the logic flow 500 is essentially identical to that of logic flow 300 of FIG. 3, except that it lacks the step of adding padding to the extents defined by the information from Command & Decision block 42 of FIG. 1B. This step of adding padding appears in FIG. 3 as block 314.

Figure 6:
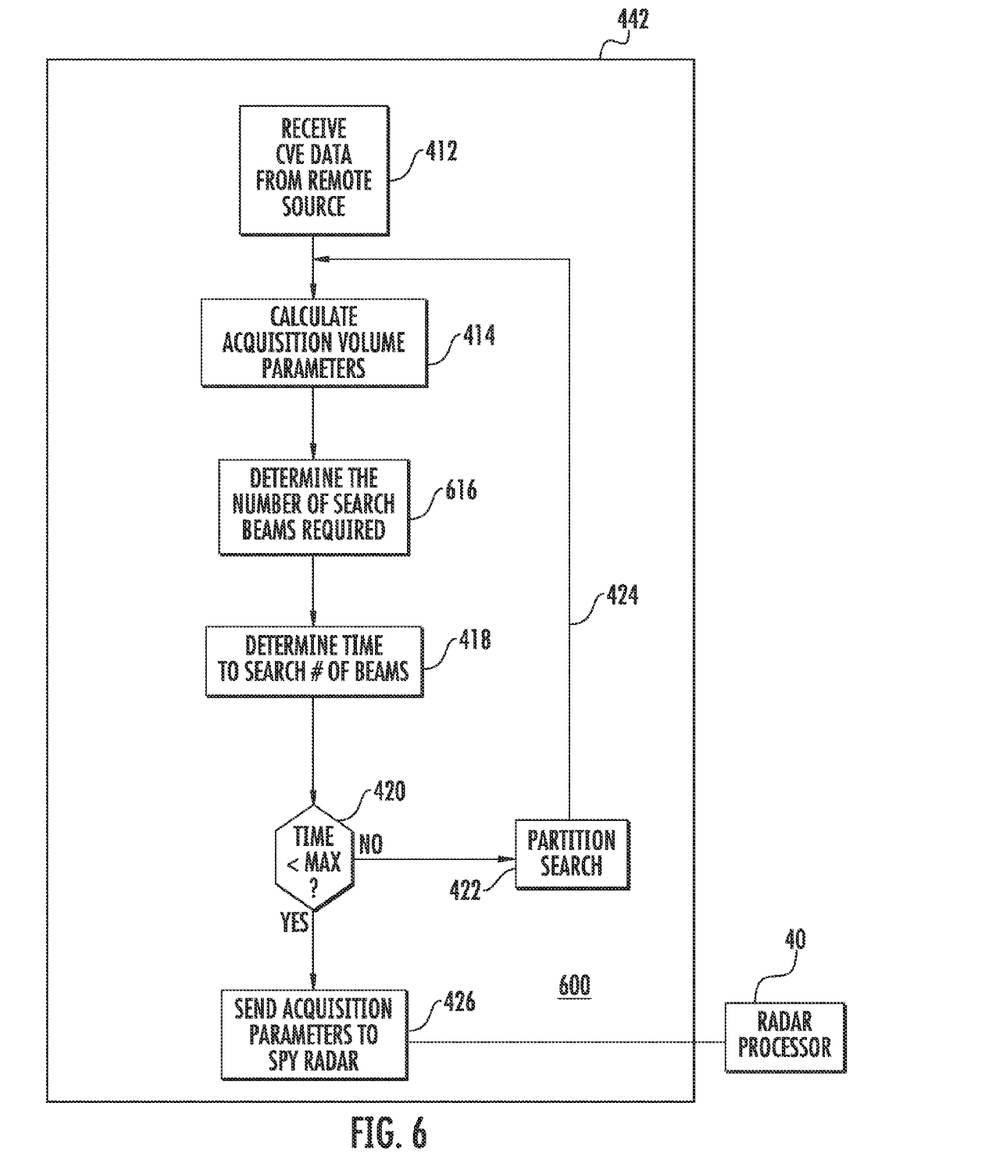
FIG. 6 is a simplified logic or control flow chart or diagram generally similar to that of FIG. 4, showing modifications to the logic of the Command & Decision portion of the block diagram of FIG. 1B.

FIG. 6 is a simplified logic flow chart or diagram of the processing performed by Command & Decision block 442 having modified logic compared to that of Command & Decision block 42 of FIG. 1 in accordance with an aspect of the invention. In short, the extents are calculated in a different manner, which is selected to more closely take advantage of the unpadded logic flow 500 of FIG. 5 to minimize the number of beams required to completely cover the search face, without scalloped regions in which coverage of the area has reduced effectiveness.

In FIG. 6, the logic flow is similar to that of FIG. 4, and those blocks which are essentially identical to those of FIG. 4 are designated by the same reference alphanumerics. In FIG. 6, block 616 determines the number of beams required to completely fill the unpadded extents determined in block 414 in accordance with an aspect of the invention. This determination of the number of beams is made by $$N_{MBA} = (2n+1)\left(m + \frac{1}{2}\right) + \frac{(-1)^{n+m}}{2} \tag{2}$$

where:

$$m = \text{ceiling}\left(\frac{A_{ext}}{\Delta A}\right) \tag{3}$$

is the minimum number of beams in a beam row (defined as adjacent beams with centers at constant elevation and separated by $2\Delta A$) required to completely cover an azimuth extent $A_{ext}$;

$$n = \text{ceiling}\left(\frac{E_{ext} - \frac{\beta}{2}\sin\alpha}{\Delta E}\right) \tag{4}$$

where:

$n_E = 2n+1$ is the number of beam rows required to completely cover an acquisition face with elevation extent $E_{ext}$ where the difference in elevation of adjacent beam rows, i.e. the separation in the direction of elevation of the centers of beams in adjacent rows, is given by $\Delta E$;

ceiling(x) is the smallest integer greater than or equal to x;

β is the beam width, the cross-section of a typical radar beam is a circular region of diameter β within which the beam energy is higher than a threshold value such as 3 dB, and outside of which the energy is less than this threshold; and α is equal to ½ the acute angle between two lines extending from the center of a radar beam to the points of intersection of the circumference of the beam with the circumference of an adjacent beam.

Figure 7:
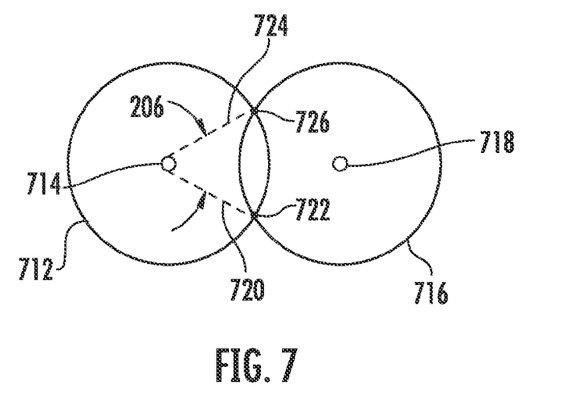
FIG. 7 illustrates overlapping radar beams to illustrate angle α.

FIG. 7 illustrates the physical meaning of the term a used in equation (4). In FIG. 7, a contour, such as the −3 dB contour, of a first radar beam is designated 712, and its center is 714. A second, overlapping beam contour is designated 716, and its center is 718. A first dash line 720 extends from the center 714 of beam 712 to the intersection or overlap of the contours of beams 712 and 714 at point 722. A second dash line 724 extends from the center 714 of beam 712 to the intersection or overlap of the contours of beams 712 and 714 at point 726. The included acute angle between dash lines 720 and 724 subtends two α, so α is one-half of the angle between lines 720 and 724.

Thus, the arrangement according to the invention modifies the way in which the SPY radar system fills the extent by eliminating padding, and resolves the scalloping problem by determining in the Command and Decision arrangement the number of beams required to exactly fill the unpadded extent. This, in turn, eliminates the extra rows and columns which may be included in a search with the prior art arrangement, thereby reducing the overall search time and also reducing the possibility of aborting the search function before the search volume has been completely searched.

Thus, a method according to an aspect of the invention is for selecting radar beams (such as 232, 234) for searching a search volume, based upon, or from, estimated target angle and angle covariance together with target range. The method comprises the step of determining the central angle (+) and the azimuth ($Az_{extent}$) and elevation ($El_{extent}$) extents required to be searched, to thereby define an acquisition face (212). The number of beams $N_{MBA}$ that are required to cover the acquisition face (212) is calculated (block 616) by $$N_{MBA} = (2n+1)\left(m+\frac{1}{2}\right) + \frac{(-1)^{n+m}}{2} \quad (2)$$

where:

$$m = \text{ceiling}\left(\frac{A_{ext}}{\Delta A}\right) \quad (3)$$

is the minimum number of beams in a beam row (defined as adjacent beams with centers at constant elevation and separated by $2\Delta A$) required to completely cover an azimuth extent $A_{ext}$;

$$n = \text{ceiling}\left(\frac{E_{ext} - \frac{\beta}{2}\sin\alpha}{\Delta E}\right) \quad (4)$$

where:
$n_E = 2n+1$ is the number of beam rows required to completely cover an acquisition face with elevation extent $E_{ext}$ where the difference in elevation of adjacent beam rows, i.e. the separation in the direction of elevation of the centers of beams in adjacent rows, is given by $\Delta E$;
ceiling(x) is the smallest integer greater than or equal to x;
$\beta$ is the beam width, the cross-section of a typical radar beam is a circular region of diameter $\beta$ within which the beam energy is higher than a threshold value such as 3 dB, and outside of which the energy is less than this threshold; and
$\alpha$ is equal to ½ the acute angle between two lines extending from the center of a radar beam to the points of intersection of the circumference of the beam with the circumference of an adjacent beam.

The number of beams $N_{MBA}$ is multiplied by the dwell per beam to thereby determine the total search time, and the total search time do determined is compared with a maximum permissible search time, and
(a) if the total search time is greater than the maximum permissible search time, the acquisition face is partitioned, and for the partitioned acquisition face, at least the steps of calculating the number of beams $N_{MBA}$, multiplying the number of beams NMBA by the dwell per beam to determine the total search time, and comparing the total search time with a maximum permissible search time are repeated
(b) if the total search time is less than the maximum permissible search time, the acquisition face information is applied to a radar processor (40) for filling the unextended acquisition face with the number $N_{MBA}$ of beams. Using the radar processor (40), the acquisition face is filled with the number $N_{MBA}$ of beams in a particular pattern, which may be a rosette pattern (233).

What is claimed is:
1. A method for selecting radar beams in a radar system for searching a search volume from estimated target angle and angle covariance together with target range, said method comprising the steps of:
determining central angle and azimuth and elevation extents to be searched, to define an acquisition face;
calculating a number of radar beams $N_{MBA}$ that cover the acquisition face by

$$N_{MBA} = (2n+1)\left(m+\frac{1}{2}\right) + \frac{(-1)^{n+m}}{2}$$

where:

$$m = \text{ceiling}\left(\frac{A_{ext}}{\Delta A}\right)$$

is a minimum number of beams in a beam row comprising adjacent beams with centers at constant elevation and separated by $2\Delta A$ to completely cover an azimuth extent $A_{ext}$;

$$n_E = \text{ceiling}\left(\frac{E_{ext} - \frac{\beta}{2}\sin\alpha}{\Delta E}\right)$$

where:
$n_E = 2n+1$ is a number of beam rows to cover an acquisition face with elevation extent $E_{ext}$ where a difference in elevation of adjacent beam rows comprising a separation in the direction of elevation of the centers of beams in adjacent rows is given by $\Delta E$;
ceiling(x) is a smallest integer greater than or equal to x;
$\beta$ is a beam width, wherein a cross-section of a radar beam is a circular region of diameter $\beta$ within which beam energy is higher than a threshold value, and outside of which the energy is less than the threshold; and
$\alpha$ is equal to ½ an acute angle between two lines extending from a center of a radar beam to points of intersection of a circumference of the beam with the circumference of an adjacent beam;
multiplying the number of beams $N_{MBA}$ by a dwell per beam to determine a total search time;
comparing said total search time with a maximum permissible search time and
(a) if said total search time is greater than said maximum permissible search time, partitioning said acquisition face, and for the partitioned acquisition face, repeating at least said step of calculating the number of beams $N_{MBA}$, multiplying the number of beams $N_{MBA}$ by the dwell per beam to determine the total search time, and comparing said total search time with a maximum permissible search time; or (b) if said total search time is not greater than said maximum permissible search time, applying acquisition face information to a radar processor for filling the acquisition face with the number $N_{MBA}$ of beams; and using said radar processor, filling said acquisition face with said number $N_{MBA}$ of beams in a generation pattern.

2. A method according to claim 1, wherein said generation pattern is a rosette pattern.

3. A method according to claim 1, wherein said threshold value is about 3 dB.

4. A method for selecting radar beams in a radar system for searching a search volume, said method comprising the steps of:

determining central angle and azimuth and elevation extents of said search volume, to define an acquisition face;

calculating a number of radar beams to cover the acquisition face by multiplying the number of beams by a dwell per beam to determine a total search time;

comparing said total search time with a maximum permissible search time, and (a) if said total search time is greater than said maximum permissible search time, partitioning said acquisition face, and for the partitioned acquisition face, repeating at least said step of calculating the number of beams, multiplying the number of beams by the dwell per beam to determine the total search time for the partitioned acquisition face, and comparing said total search time for the partitioned acquisition face with a maximum permissible search time; or (b) if said total search time is not greater than said maximum permissible search time, applying acquisition face information to a radar processor for filling the acquisition face with the number of beams.

5. A method according to claim 4, wherein subsequent to the step of comparing said total search time for the partitioned acquisition face with a maximum permissible search time, the method further comprises the step of using said radar processor to cover the partitioned acquisition face with said number of beams in a particular generation pattern if said total search time for the partitioned acquisition face is less than said maximum permissible search time.

6. A method according to claim 5, wherein subsequent to the step of comparing said total search time for the partitioned acquisition face with a maximum permissible search time, the method further comprises the step of further partitioning said acquisition face, and for the further partitioned acquisition face, repeating at least said step of calculating the number of beams, multiplying the number of beams by the dwell per beam to determine the total search time for the further partitioned acquisition face, and comparing said total search time for the further partitioned acquisition face with a maximum permissible search time.

7. A method according to claim 4, wherein said step of calculating a number of radar beams, represented by $N_{MBA}$, to cover the acquisition face is determined by:

$$N_{MBA} = (2n+1)\left(m+\frac{1}{2}\right) + \frac{(-1)^{n+m}}{2}$$

where:

$$m = \text{ceiling}\left(\frac{A_{ext}}{\Delta A}\right)$$

is a minimum number of beams in a beam row comprising adjacent beams with centers at constant elevation and separated by $2\Delta A$ to completely cover an azimuth extent $A_{ext}$;

$$n_E = \text{ceiling}\left(\frac{E_{ext} - \frac{\beta}{2}\sin\alpha}{\Delta E}\right)$$

where:

$n_E=2n+1$ is a number of beam rows that cover an acquisition face with elevation extent $E_{ext}$ where a difference in elevation of adjacent beam rows comprising a separation in the direction of elevation of the centers of beams in adjacent rows is given by $\Delta E$;

ceiling(x) is a smallest integer greater than or equal to x;

$\beta$ is a beam width, wherein a cross-section of a radar beam is a circular region of diameter $\beta$ within which beam energy is higher than a threshold value, and outside of which the energy is less than the threshold; and $\alpha$ is equal to ½ an acute angle between two lines extending from a center of a radar beam to points of intersection of a circumference of the beam with the circumference of an adjacent beam.

8. A method according to claim 4, wherein said generation pattern is a rosette pattern.

9. A method according to claim 4, wherein said threshold value is about 3 dB.

10. A system for selecting radar beams for searching a search volume, said system comprising:

a processor executing instructions for performing the steps of:

determining central angle and azimuth and elevation extents of said search volume, to define an acquisition face;

calculating a number of radar beams to cover the acquisition face by multiplying the number of beams by a dwell per beam to determine a total search time; and comparing said total search time with a maximum permissible search time, (a) if said total search time is greater than said maximum permissible search time, partitioning said acquisition face, and for the partitioned acquisition face, repeating at least said step of calculating the number of beams, multiplying the number of beams by the dwell per beam to determine the total search time for the partitioned acquisition face, and comparing said total search time for the partitioned acquisition face with a maximum permissible search time; or (b) if said total search time is not greater than said maximum permissible search time, applying acquisition face information to a radar processor for filling the acquisition face with the number of beams.

11. A system according to claim 10, wherein the processor executes instructions to, subsequent to the step of comparing said total search time for the partitioned acquisition face with a maximum permissible search time, perform the further step of using said radar processor to cover the partitioned acquisition face with said number of beams in a particular generation pattern if said total search time for the partitioned acquisition face is less than said maximum permissible search time.

12. A system according to claim 11, wherein the processor executes instructions to, subsequent to the step of comparing said total search time for the partitioned acquisition face with a maximum permissible search time, perform the additional step of further partitioning said acquisition face, and for the further partitioned acquisition face, repeating at least said step of calculating the number of beams, multiplying the number of beams by the dwell per beam to determine the total search time for the further partitioned acquisition face, and comparing said total search time for the further partitioned acquisition face with a maximum permissible search time.

13. A system according to claim 10, wherein said step of calculating a number of radar beams, represented by $N_{MBA}$, to cover the acquisition face is determined by:

$$N_{MBA} = (2n+1)\left(m+\frac{1}{2}\right) + \frac{(-1)^{n+m}}{2}$$

where:

$$m = \text{ceiling}\left(\frac{A_{ext}}{\Delta A}\right)$$

is a minimum number of beams in a beam row comprising adjacent beams with centers at constant elevation and separated by $2\Delta A$ to completely cover an azimuth extent $A_{ext}$;

$$n_E = \text{ceiling}\left(\frac{E_{ext} - \frac{\beta}{2}\sin\alpha}{\Delta E}\right)$$

where:
- $n_E = 2n+1$ is a number of beam rows that cover an acquisition face with elevation extent $E_{ext}$ where a difference in elevation of adjacent beam rows comprising a separation in the direction of elevation of the centers of beams in adjacent rows is given by $\Delta E$;
- ceiling(x) is a smallest integer greater than or equal to x;
- $\beta$ is a beam width, wherein a cross-section of a radar beam is a circular region of diameter $\beta$ within which beam energy is higher than a threshold value, and outside of which the energy is less than the threshold; and
- $\alpha$ is equal to ½ an acute angle between two lines extending from a center of a radar beam to points of intersection of a circumference of the beam with the circumference of an adjacent beam.

14. A system according to claim 10, wherein said generation pattern is a rosette pattern.

15. A system according to claim 10, wherein said threshold value is about 3 dB.

* * * * *